United States Patent Office 2,860,049
Patented Nov. 11, 1958

2,860,049

METHOD AND COMPOSITION FOR INCREASING ANIMAL GROWTH RATE

Karl Schröder, Kundl, Austria

No Drawing. Application December 2, 1955
Serial No. 550,795

Claims priority, application Austria December 14, 1954

8 Claims. (Cl. 99—2)

This invention relates to the stimulation of animal growth rate, and more particularly to compositions and methods capable of stimulating animal growth rate, or enhancing the utilization of feedstuffs by animals.

In recent years it has been found that certain substances when administered to domestic animals of a type normally used as sources of meat can increase the growth rate or accumulation of poundage by the animals. Thus for example, various antibiotics and other chemical substances, such as stilbestrol, have been administered to meat-source animals of one kind or another in an endeavor to make the animals ready for market at an earlier date than would customarily be the case, or to increase the vendibility of the animal by increased weight gain or meat quality, or other desirable feature.

Although in some instances the substance capable of producing the desired effect has been administered parenterally, by injection or by pellet implantation, it has commonly been the practice, wherever possible, to administer the substance orally, and it has been the preferred practice from a standpoint of convenience at least, to incorporate the substance in suitable amount in the feed of the animal as an additive thereto to provide a supplemented feedstuff. Thus by feeding the animal its daily ration of feedstuff, the animal automatically receives a quantity of the added substance which is effective to accomplish the desired purpose.

It has now been discovered that in meat-source animals such as ruminants, swine, poultry and the like, an increased rate of growth and an enhanced utilization of feedstuff can be produced by orally administering periodically to the animals relatively small amounts of a penilloic acid or a penicilloic acid, or a relatively nontoxic salt of said acids as an additive to the feed ration.

The amount of additive to be administered daily is not critical but can be varied over a wide range, from a fraction of a milligram to fifty or more milligrams for each hundred pounds of animal weight. The preferred range of administration is from about five to about fifteen milligrams of additive daily per one hundred pounds of animal body weight, but the range is by no means critical. To provide this range, the additive can be incorporated in a complete feedstuff in an amount of about one to about forty grams per ton of feedstuff. The amount to be incorporated understandably depends to an extent upon the quantity of food customarily ingested by the particular animal. Especially is this true since the additive is employed in feedstuffs administered to young animals in their growth period, and the food intake of such animals increases with their increasing size.

Most conveniently the additive is incorporated in a complete or substantially complete feedstuff, or in a feed supplement, as for example a protein supplement, so that the animal is assured of receiving its daily dose of additive along with the consumption of its food. However, the additive can also be provided in concentrated form as a solution or in admixture with solid excipients, and the required quantity of concentrate can be measured out daily and mixed with the feed. Feed supplements which are useful for the purposes of the invention include those known as protein supplements, vitamin supplements and the like, such as soybean meal, cottonseed meal, alfalfa meal, etc. These may contain other additives such as molasses, minerals, estrogens and the like.

The additives employed in this invention are known compounds, and are readily prepared by synthetic procedures or by degradation of penicillin as described in the Chemistry of Penicillin, Princeton University Press, 1949, The penilloic or penicilloic acids can be any of the acids derivable from natural or biosynthetic penicillins, for example, penicillin G, K, O, or V. The acids themselves can be employed as additives or they can be converted into and employed as their metal or metalloid salts. As will readily be apparent, the salt employed should be relatively nontoxic and should not be cumulatively toxic. As is known, the penicilloic acids in acidic aqueous solution are quite readily degraded to penilloic acids, thus, in the event it is desired to use a penicilloic compound, it is desirable to employ the compound in the form of a mono- or dibasic salt.

The following examples more specifically illustrate the invention:

*Example 1*

A solution of 20 g. of crude penicillin V in 200 ml. of water is brought to about pH 10 by the addition of concentrated sodium hydroxide solution. The alkaline solution is allowed to stand at room temperature for about 15 minutes and then is brought to about pH 6 with concentrated hydrochloric acid. The resulting solution, containing phenoxymethyl penicilloic acid, is diluted to a volume of one liter, and thereafter is thoroughly mixed with two tons of grain meal.

For use in stimulating growth rate in feeder cattle, about 2 kg. per day are added to the ration of a 400 pound calf. Larger animals may be fed a correspondingly larger amount of the additive.

Instead of grain meal, the phenoxymethyl penicilloic acid solution described above can be mixed with two tons of dried feed yeast, fish meal, blood meal, middlings, and the like, to provide a feed additive which is used in the same way.

*Example 2*

15 g. of sodium benzyl penilloate are dissolved in 10 l. of water.

For use as an animal growth stimulant, the solution is mixed with the daily feed ration of each animal.

*Example 3*

To one ton of a grain meal type feed ration are added 20 g. of sodium benzyl D penicilloate and the mixture is stirred until the sodium benzyl D penicilloate is uniformly distributed throughout the mass. This feed mixture is fed young, growing beef cattle as one-half or more of their daily ration.

*Example 4*

To 100 pounds of soybean meal are added 25 g. of sodium n-heptyl penicilloate (derived by the degradation of penicillin K) with thorough mixing until the latter is uniformly distributed throughout the soybean meal.

For use as a feed ration additive to obtain increased weight gain, this mixture is added to the daily feed ration of feeder cattle in the amount of about two ounces per day.

What is claimed is:

1. The method of stimulating meat-source animal growth which comprises adding to the animal's feed ration in a quantity sufficient to provide an amount of about one to about fifty milligrams daily per 100 pounds of animal weight, a member of the group consisting of a penilloic acid, a penicilloic acid and nontoxic salts thereof.

2. The method according to claim 1, wherein the amount of additive is from five to about fifteen milligrams daily per 100 pounds of animal weight.

3. The method according to claim 1, wherein the additive is a penilloic acid.

4. The method according to claim 1, wherein the additive is a penicilloic acid.

5. The method according to claim 1, wherein the additive is a nontoxic salt of a penicilloic acid.

6. The method according to claim 1, wherein the additive is sodium benzyl D penicilloate.

7. The method according to claim 1, wherein the additive is sodium benzyl D penilloate.

8. The method of stimulating meat-source animal growth which comprises incorporating in a substantially complete feedstuff in an amount of about one to forty grams per ton of feedstuff, a member of the group consisting of a penilloic acid, a penicilloic acid and nontoxic salts thereof.

References Cited in the file of this patent

UNITED STATES PATENTS 2,768,081     Buckwalter _____ Oct. 23, 1956

OTHER REFERENCES

Chemistry of Penicillin, Princeton Univ. Press (1949), pp. 538–544.